O. M. WEST.
AUTOMOBILE DIRECTION SIGNAL.
APPLICATION FILED AUG. 29, 1921.
1,423,379.   Patented July 18, 1922.
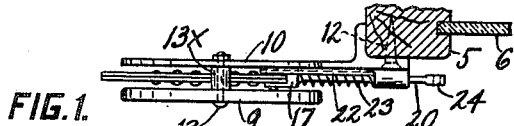
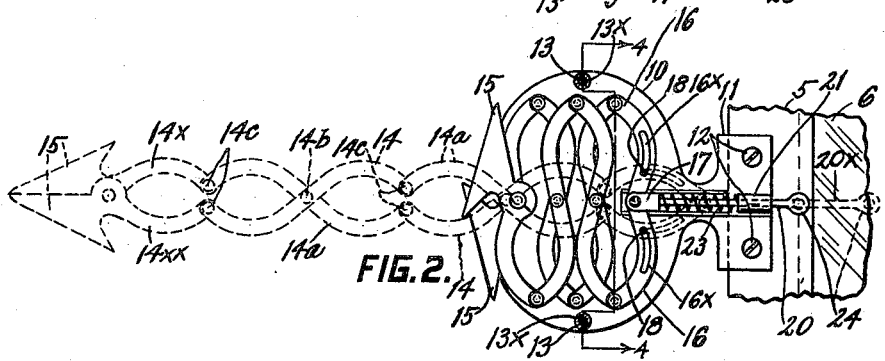
Inventor
Oscar M. West.
By A. M. Carlsen
Attorney

UNITED STATES PATENT OFFICE.

OSCAR M. WEST, OF ST. PAUL, MINNESOTA.

AUTOMOBILE DIRECTION SIGNAL.

1,423,379. Specification of Letters Patent. Patented July 18, 1922.

Application filed August 29, 1921. Serial No. 496,500.

*To all whom it may concern:*

Be it known that I, OSCAR M. WEST, a citizen of the United States, residing at St. Paul, in the county of Ramsey and State of Minnesota, have invented a new and useful Automobile Direction Signal, of which the following is a specification.

My invention relates to direction signals for vehicles, particularly automobiles; and the object is to provide a device which is of light, compact and durable construction, easily operated and readily mounted on any type of vehicle within easy reach of the driver.

The above object I attain by the construction illustrated in the accompanying drawing, in which;

Fig. 1 is a top view of my device attached to the frame of an automobile wind shield.

Fig. 2 is a front elevation of Fig. 1, omitting one shield member and showing the signal arm (in dotted lines) in extended position.

Fig. 3 is an elevation of two of my devices mounted on opposite ends of an automobile wind shield approximately as they would appear viewed from the driver's seat.

Fig. 4 is an enlarged sectional elevation as on line 4—4 in Fig. 2.

Referring to the drawing by reference numerals, 5 designates the upright frame bars and 6 the glass of an automobile wind shield. 7 is the so-called instrument board located below the wind shield and in front of the driver, and 8 (shown dotted in Fig. 3) is the steering wheel in approximately correct position with relation to other parts of an automobile above described.

My device consists of a light frame comprising two vertically disposed spaced plates 9, 10, of which plate 9 preferably holds a mirror or reflector 9×, while 10 has a bracket extension 11 with perforations for insertion of screws 12 to secure said frame at any desired height on upright 5. The plates are connected rigidly by bolts 13 extending through intermediate spacers 13×. The space between the plates contains the main working parts of my device constructed and operated as follows:

The signal arm of my device is a horizontally projected device formed on the lazy-tongs principle normally in folded or retracted position between the plates 9 and 10. It comprises a series of flat, preferably S-shaped cross bars 14, 14ª pivotally connected at their crossings 14ᵇ and each pair of such cross arms pivotally connected to the next pair at their ends as at 14ᶜ. The extreme outer pair of such cross bars 14 and 14××, have their free outer ends 15 formed in triangular shape to make the appearance of an arrow head (see Fig. 2) when the indicator arm is extended. This construction being in effect a so-called lazy-tong, can be readily extended to the signalling position indicated in dotted lines in Fig. 2 or retracted into the space between plates 9 and 10 by simply pushing or pulling on two links 16 pivotally connected with their outer ends to the adjacent cross bars 14, 14ª; the inner ends of links 16 being brought together and pivotally connected in a cross-head 17. Said links 16 are slotted as at 16× intermediate their ends, each slot being engaged by a stationary pin 18 secured in plate 10 (see Figs. 2 and 4). Said stationary pins act as fulcrums for the links making them beam levers spaced from plate 10 by spacers 19 corresponding to height of inner ends of links 16 where the latter are pivoted in cross-head 17 (see Fig. 4).

Cross-head 17 has an inwardly projecting horizontal rod member 20 guided in a bearing 21 and the cross-head itself is guided in a straight channel 22 secured to plate 10 or formed integral therewith. A compression coil spring 23 on rod 20, between bearing 21 and cross-head 17, tends to keep the signal arm in retracted position (as in Fig. 2). An eyelet 24 at the inner end of rod 20 provides means for operating the rod endwise against the force of the spring 23 and this is preferably done in the following manner.

In Fig. 3 I have shown two of my devices on an auto wind shield for right and left hand signalling operated by means of levers 25 pivoted in brackets 26 secured on the instrument board or other convenient place in front of the driver. One end of each lever is connected with a cable 27 inserted in a guiding conduit 28 which extends horizontally to the vertical frame member 5, then upwardly as 28ª, thence outwardly at right angles and terminating at a point concentric with bearing 21 of the signal device. The upper end of each cable 27 is connected with the eyelet 24 of its corresponding rod 20.

The device is operated as follows:

Assuming that the driver of the car wishes to indicate that he is about to make a left turn, he pushes the left side lever 25 to the left, either by hand or with his left knee, to approximately the position shown dotted in Fig. 3. The opposite end of said lever pulls cable 27 which in turn pulls rod 20 (see Fig. 2) to approximately position 20×, simultaneously sliding cross-head 17 toward bearing 21 against pressure of spring 23. The sliding of cross-head 17 pulls at the inner ends of links 16 which causes the outer end to move outwardly or toward the left as in Fig. 2. The motion of the links 16 is instantly transmitted through bars 14 and 14ᵃ, throwing them outward horizontally as indicated in dotted lines in Fig. 2 and forming a comparatively long and rigid arm with an arrow like point projecting to the left. A bright coloring on this extension arm will make it appear quite prominently and can be readily seen by drivers of other automobiles on the same road. The pressure of spring 23 causes the retraction of the signal arm to its original position when lever 25 is released. To indicate a right turn the right hand signalling device is operated in the same manner as the left except that right hand lever 25 in front of driver is pushed to the right.

My device is mounted at a height corresponding to the height of the driver's head, with the mirror side toward the rear, said mirror taking the place of the so-called reflectors ordinarily used on many cars and enabling the driver to tell at a glance if other cars are following near enough to require the use of the signalling device when he intends to make a turn.

What I claim is:

1. In a device of the class described, a vertically disposed outwardly projecting housing and means for securing same to a stationary part of a vehicle near the driver thereof, a foldable and horizontally extensible signal arm normally contained in the housing and means near the driver operatively connected with the signal arm to extend it out horizontally from the housing, said extensible signal arm being composed of cross bars pivotally connected at their crossings and pivoted together at their ends in the manner of lazy tongs, the outer members terminating in triangular points forming an arrow head when the arm is extended; the inner members of the arm forming beam levers mounted to tilt and slide in the housing, a cross head slidable in the housing and pivoted to the inner ends of said beam lever, a horizontally disposed rod fixed in the cross head, a bearing on the housing for the rod to slide in, a compression coil spring encircling the rod between the bearing and the cross head and tending at all times to push the cross head and the rod outward and thereby hold the extensible arm normally in folded position and means for imparting endwise movement of the rod against the pressure of the spring, said means comprising a guided cable having one end connected to the rod and the other end connected to an operating lever mounted near the driver of the car.

2. An extensible signal arm composed of a series of beam levers pivoted together at their ends, said beam levers being S-shaped and pivoted at the middle into pairs of crossing levers; said levers in each pair having their curves arranged in opposite directions so as to give a bracing width to the arm even when it is fully extended.

In testimony whereof I affix my signature.

OSCAR M. WEST.